United States Patent [19]

Paar

[11] Patent Number: 4,892,913

[45] Date of Patent: Jan. 9, 1990

[54] NOVEL CROSSLINKING COMPONENTS CONTAINING BIURET GROUPS FOR CATIONIC PAINT BINDERS

[75] Inventor: Willibald Paar, Graz, Austria

[73] Assignee: Vianova Kunstharz, A.G., Werndorf, Austria

[21] Appl. No.: 236,201

[22] Filed: Aug. 25, 1988

[30] Foreign Application Priority Data

Aug. 25, 1987 [AT] Austria ................................. 2116/87

[51] Int. Cl.$^4$ ............................................. C08G 18/80
[52] U.S. Cl. ................................... 525/452; 525/459; 525/460; 528/45
[58] Field of Search ....................... 525/452, 459, 460; 528/45

[56] References Cited

U.S. PATENT DOCUMENTS 4,806,611  2/1989  Honel et al. .......................... 528/45

*Primary Examiner*—Maurice J. Welsh
*Attorney, Agent, or Firm*—A. W. Breiner

[57] ABSTRACT

Crosslinking components for cationic paint binders wherein substituted ureas obtained by reacting beta-hydroxyamines with isocyanate compounds are converted into biuret compounds by further reaction with isocyanates. The cross-linking components thus obtained, when combined with base resins containing hydroxyl groups and/or primary or secondary amino groups, yield films having an increased hardening capacity and greater resistance to stone chipping.

5 Claims, No Drawings

NOVEL CROSSLINKING COMPONENTS CONTAINING BIURET GROUPS FOR CATIONIC PAINT BINDERS

RELATED APPLICATIONS

This application relates to commonly assigned Willibald Paa/et al, U.S. Ser. No. 06/833,163 filed Feb. 27, 1986 entitled "Process for Producing A Crosslinking Component for Cationic Paint Binders."

FIELD OF INVENTION

This invention relates to crosslinking components for use in cationic paint binders. More particularly, the invention relates to crosslinking components containing biuret groups for use with cationic paint binders containing hydroxyl groups and/or primary or secondary amino groups, and to a process of producing such crosslinking components.

BACKGROUND OF INVENTION

Crosslinking components for cationic paint binders which are obtained by reacting beta-hydroxyamines with isocyanate compounds and further reacting the resulting urea compounds with formaldehyde are disclosed in Austrian Patent No. 382,384, corresponding to commonly assigned U.S. Ser. No. 06/833,163 filed Feb. 27, 1986. It has now been found that increased curing capacity is obtained in the crosslinking components by introducing biuret groups by reacting these substituted ureas with additional isocyanate compounds. It has also been found that this can further improve the adhesive strength of the cathodically precipitated paint films containing such crosslinking components. The adhesive strength of a coat of paint, either to a metal substrate or to any subsequent coat of whatever kind, has become increasingly important in the car industry in recent years in order to prevent damage caused by stone chipping as well as to improve corrosion resistance.

SUMMARY OF INVENTION

The present invention, therefore, relates to a process for preparing crosslinking components containing biuret groups for cationic paint binders which contain hydroxyl groups and/or primary or secondary amino groups, characterized in that, preferably in aprotic solvents, (A1) beta-hydroxyamines of formula —

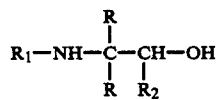

wherein —
R is a hydrogen atom or an alkyl or hydroxymethyl group,
$R_1$ is an alkyl, hydroxyalkyl, hydroxypoly(alkoxy) group or a group of formula —$CH_2$—$CH(R_4)$—$CO$—$R_3$,
$R_2$ is a hydrogen atom, an alkyl group or the residue of a monoepoxide compound after the epoxide group has been reacted with a primary amino group,
$R_3$ is an alkoxy, hydroxyalkoxy, hydroxypoly(alkoxy) group or —$NH_2$, and
$R_4$ is a hydrogen atom or a methyl group; or (A2) beta-hydroxyamines of formulae —

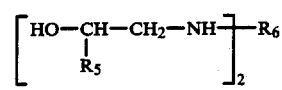

wherein —
$R_5$ in each case represents a group $R_2$ or a group $R_1$ and a monoepoxide group as defined in $R_2$,
$R_6$ represents an alkylene or poly(alkoxy) group, or —

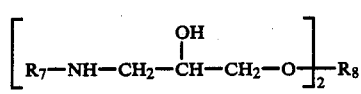

wherein —
$R_7$ represents an alkyl group, a hydroxyalkyl or tert-.aminoalkyl group,
$R_8$ represents an aliphatic and/or aromatic group of a di- or polyglycidylether, or —

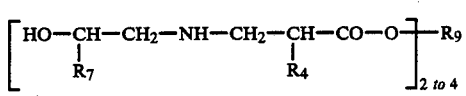

wherein —
$R_9$ represents the residue of a polyol with 2 to 4 hydroxyl groups,
are reacted with, (B) isocyanate compounds at 30 to 60° C in a ratio wherein at least one secondary amino group of a beta-hydroxyamine is reacted with an isocyanate group, with the proviso that essentially polyisocyanate compounds are used for the betahydroxyamines of group (A1), and essentially monoisocyanate compounds are used for the beta-hydroxyamines of group (A2); and, thereafter, (C) the NH-groups and any other isocyanate-reactive groups of the reaction product which may be present are reacted with 50 to 100 mole-% of a semi-blocked diisocyanate at 20 to 100° C.

The invention further includes the crosslinking components prepared by the process and to the use of the crosslinking components of the invention in combination with a base resin carrying hydroxyl groups and/or primary or secondary amino groups in a ratio of from about 60 to 95%, preferably 70 to 85%, by weight of the base resin to 5 to 40%, preferably 15 to 30%, by weight of the crosslinking component in cathodically precipitated electrodeposition paints.

The crosslinking components prepared according to the invention produce, in conjunction with cationic base resin components carrying hydroxyl and/or primary or secondary amino groups, preferably resin components based on epoxide-amine adducts or products having similar molecular components, binders which can be stoved at temperatures of 150° C and upward.

GENERAL DESCRIPTION OF INVENTION

The beta-hydroxyamines used according to the invention are described in the above-mentioned Austrian Patent No. 382,384, corresponding to U.S. Ser. No. 06/833,163 filed Feb. 27, 1986. The compounds of group (A1) are, as described therein, secondary amines such as diethanolamine, diisopropanolamine, and the homologous beta-hydroxyamines. Beta hydroxyamines with secondary hydroxyl groups are preferably used. Instead of these simple amines, it is also possible to use reaction products of primary alkylamines with monoepoxide compounds, such as glycidyl esters of monocarboxylic acids. The MICHAEL-adducts of acrylic acid esters or acrylamide to primary beta-hydroxyamines, such as monoethanolamine or monoisopropanolamine and other homologous beta-hydroxyamines, can also be utilized.

Amines of group (A2), i.e., amines with two or more beta-hydroxyamino groupings, are obtained for example —

(a) by reacting N-ethanol-alkylenediamines such as N-ethanol-ethylenediamine (aminoethyl-ethanolamine) or corresponding alkylene homologues or primary alkylene diamines, such as ethylenediamine and its homologues, more particularly hexamethylenediamine, with monoepoxide compounds, particularly glycidyl esters of monocarboxylic acid;

(b) by reacting primary alkylmonoamines having four or more carbon atoms with di- or polyglycidyl compounds such as diglycidylethers of aliphatic or aromatic di- or polyhydroxy compounds, for example glycols, diphenols or phenol novolaks, preferably polyalkyleneglycols; and (c) by reacting primary beta-hydroxyamines with polyacrylates such as di-propyleneglycoldiacrylate or trimethylolpropanetriacrylate.

In the first reaction step of the described process, if amines of group (A1) are used, i.e., beta-hydroxyamines which have only one beta-hydroxy grouping, polyisocyanates such as the diisocyanates are used as the isocyanate compounds to ensure sufficient functionality to achieve crosslinking. These polyisocyanate compounds include, for example, the aromatic diisocyanates such as toluylene diisocyanate, aliphatic diisocyanates such as hexamethylene diisocyanate, or cycloaliphatic diisocyanates such as isophorone diisocyanate. Higher functional isocyanate compounds which may be used include the known adducts of diisocyanates to polyols.

Examples of monoisocyanates which may be used when using amines of group (A2) include monoisocyanates such as phenylisocyanate or alkylisocyanates and semi-blocked diisocyanates, e.g., consisting of equimolar amounts of toluylenediisocyanate and aliphatic monoalcohols.

The use of combinations of diisocyanates and amines of group (A2) can result in the synthesis of higher molecular structures such as —

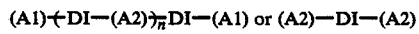

(A1)—(DI—(A2))$_n$—DI—(A1) or (A2)—DI—(A2)

wherein —

DI is the moiety of a diisocyanate and n≧1, preferably 1.

The substituted urea compounds are prepared by reacting the beta-hydroxyamine, preferably in the presence of an aprotic solvent such as toluene, xylene or methylisobutylketone, with the isocyanate compound at temperatures of from about 25 to 40° C. The isocyanate compound is slowly added to the amine with cooling. The reaction is substantially complete when the addition of the amine is finished. The reaction is monitored by measuring the NCO-value.

In a further reaction step, the substituted urea is reacted with semi-blocked isocyanates at 20 to 100° C, the addition advantageously taking place at low temperature. The reaction is then completed at an increased temperature until an NCO-value of zero is obtained. The semi-blocked diisocyanates used can be either the same compounds optionally used in the first reaction step, or other diisocyanates and blocking agents can be used. Preferably, diisocyanates are used wherein the NCO-group has a different reactivity with the blocking agent, as is the case, for example, with 2,4-toluylene diisocyanate or isophorone diisocyanate. Monoalcohols with four or more carbon atoms are the preferred blocking agents.

The alpha, beta-ethylenically unsaturated monoisocyanate compounds which can be used are prepared by partial reaction of a diisocyanate with hydroxy(meth)acrylates. The product is used as obtained or as a solution in a suitable solvent such as propyleneglycol monomethylether diethyleneglycol dimethylether, or methylisobutylketone.

The ratios of components used in the preparation of the crosslinking component are selected so that in the first reaction step one isocyanate group is available for each secondary amino group. In the second reaction step, 0.5 to 1.0 mole (50 to 100 mole-% of the isocyanate-reactive groups) of the semi-blocked diisocyanate are used for each isocyanate-reactive group. The term "isocyanate-reactive groups" includes both the hydrogen atoms of the urea configuration, which lead to the formation of biuret structures, and also any other isocyanate-reactive sites such as hydroxyl groups or other amino groups present in the molecule. The reaction is carried out in the presence of isocyanate-inert solvents at 50 to 70° C until an NCO-value of virtually zero is obtained.

Paints are produced by mixing the crosslinking components obtained according to this invention with a base resin component in known manner at moderately elevated temperature. The crosslinking components of the invention are used with the base resin component in a quantity of from 10 to 40% by weight, preferably 15 to 30% by weight, based on the total binder. The formulation of the paints, their pigmenting, preparation and processing, particularly by the cathodic electrodeposition method, is well known to those skilled in the art.

PRESENTLY PREFERRED EMBODIMENTS

The examples which follow illustrate the invention without restricting its scope. All parts or percentages given are units by weight, unless otherwise stated.

EXAMPLE 1

Part A : Crosslinking Component 622 parts of a reaction product of equimolar quantities of monoethanolamine and a glycidylester of a branched $C_9$-$C_{11}$-monocarboxylic acid (molecular weight 311) and 616 parts of a reaction product of 1 mole of 1,6-hexamethylenediamine and 2 mole of the above-mentioned monocarboxylic acid (molecular weight 616) are reacted with 348 parts of toluylene diisocyanate (standard commercial isomer mixture) in the presence of 680 parts of toluene at 30 to 40° C until an NCO-value of zero is obtained. 2736 parts (9.0 mole) of a toluylene diisocyanate semi-blocked with 2-ethylhexanol and 1290 parts of toluene are then added to the solution, and the temperature is increased from 40° C to 100° C within two hours. The reaction is continued until an NCO-value of zero is obtained. The toluene is then removed by vacuum distillation and replaced by an equal amount of methoxypropanol.

Part B : Base Resin 168 g of isononanic acid, 53 g of diethanolamine, and 33 g of diethylaminopropylamine are added to a solution of 1000 g of an epoxy resin which is the reaction product of epichlorohydrin and bisphenol-A having an epoxide equivalent weight (EEW) of about 500 in 551 g of ethoxypropanol at 70° C. The temperature of the reaction mixture is raised to and kept at 95 to 100° C until an acid number of less than 3 mg KOH/g is obtained. The base resin has a hydroxyl number of 270 mg KOH/g.

60 parts of the base resin of Part B are mixed with 40 parts of the crosslinking components of Part A, parts given referring to 100% resin solids. After the addition of 1% tin in the form of dibutyltindilaurate and 55 mMole of formic acid, a 15% clear varnish is produced with the addition of water. A film of the clear varnish cathodically deposited onto degreased steel panels having a dry film thickness of 22±2 microns after hardening for thirty minutes at 150° C has a resistance to methylethylketone of at least 300 double rubs.

EXAMPLE 2

Part A : Crosslinking Component 190 parts of a bisphenol-A/diglycidllether (EEW about 190) are dissolved in 77 parts of diethyleneglycol dimethylether and reacted at 80° C with 119 parts (1 mole) of aminoethylpropanediol until the epoxide groups have been reacted entirely. After the addition of 900 parts of diethyleneglycol dimethylether, 1520 parts (5 mole) of a toluylene diisocyanate semi-blocked with 2-ethylhexanol are added within one hour, and the mixture is reacted at 90° C until an NCO-value of zero is obtained.

Part B : Base Resin 500 parts of an epoxy resin based on bisphenol-A and epichlorohydrin (EEW about 500) are dissolved in 214 parts of propyleneglycol monomethylether and reacted at 110° C with 83 parts of a semiester of phthalic anhydride and 2-ethylhexanol in the presence of 0.5 g of triethylamine as catalyst to an acid number of less than 3 mg KOH/g. Then 120 parts of NH-functional oxazolidine consisting of aminoethylethanolamine, 2-ethylhexylacrylate and formaldehyde, as well as 26 parts of diethylaminopropylamine are added and the mixture is reacted at 80° C until an epoxide value of virtually zero is obtained. The mixture is diluted with 200 parts of propyleneglycol monomethylether.

70 parts of the base resin (100% resin solids) of Part B are mixed with 30 parts of the crosslinking component (100% resin solids) of Part A. After the addition of 0.6% tin in the form of dibutyltindilaurate and 40 mMole of acetic acid, a 15% clear varnish is prepared with addition of water. A film cathodically deposited onto a degreased steel panel having a dry film thickness of 22±2 microns after hardening for thirty minutes at 150° C has a resistance to methylethylketone of at least 300 double rubs.

EXAMPLE 3

Part A : Crosslinking Component 226 parts (2 mole) of diisopropanolamine are dissolved in 600 parts of N-methylpyrrolidone and reacted at 30 to 40° C, with cooling, with 210 parts (1 mole) of trimethylhexamethylene diisocyanate. The reaction product is heated to 70° C and after the addition of 1560 parts (5 mole) of an isophorone diisocyanate semi-blocked with ethyleneglycol monoethylether and 0.2 parts of triethylamine catalyst, the mixture is reacted until an NCO-value of zero is obtained.

70 parts of the base resin as defined in Part B of Example 2 are mixed with 30 parts, based on 100% resin solids, of the crosslinking component of Part A of this example. After the addition of 0.6% tin in the form of dibutyltindilaurate and 40 mMole of acetic acid, a 15% clear varnish is prepared with addition of water. A film cathodically deposited onto a degreased steel panel having a dry film thickness of 22±2 microns after hardening for thirty minutes at 170° C has a resistance to methylethylketone of at least 300 double rubs.

EXAMPLE 4

Part A : Crosslinking Component 640 parts of polypropyleneglycol diglycidylether (EEW about 320) are reacted at 80° C with 121 parts (1 mole) of tris(hydroxymethyl)aminomethane (trisamine) until one epoxide group has been reacted. After the addition of 92 parts (0.9 mole) of dimethylaminopropylamine, the reaction is continued at 80° C until an epoxide value of zero is attained. 700 parts of diethyleneglycol dimethylether and 2808 parts (9 mole) of a toluylene diisocyanate semi-blocked with isononanol are added, and the mixture is reacted at 85 to 90° C until an NCO-value of zero is obtained.

60 parts, based on 100% resin solids, of a resin prepared by reacting 1 mole of an epoxy resin based on bisphenol-A and epichlorohydrin having an epoxide equivalent weight of about 475 with 2 mole of diethanolamine in a 70% solution in methoxypropanol are mixed with 40 parts, based on 100% resin solids, of the crosslinking component of Part A of this example. After the addition of 1% tin as dibutyltindilaurate and 50 mMole of formic acid, a 20% clear varnish is prepared with addition of water. A film cathodically deposited onto degreased steel panels having a dry film thickness of 22+2 microns after hardening thirty minutes at 150° C has a resistance to methylethylketone of at least 300 double rubs.

As will be apparent to one skilled in the art, various modifications can be made within the scope of the aforesaid description. Such modifications being within the ability of one skilled in the art form a part of the present invention and are embraced by the appended claims.

It is claimed:

1. Process for preparing crosslinking components containing biuret groups for use with cationic paint binders containing hydroxyl groups and/or primary or secondary amino groups, comprising reacting —

(A1) beta-hydroxyalkylamines having the formula —

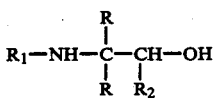   (I)

wherein —
R is a hydrogen atom or an alkyl or hydroxymethyl group,
R₁ is an alkyl, hydroxyalkyl, hydroxypoly(alkoxy) group or a group of formula —CH₂—CH(R₄)—CO—R₃,
R₂ *is a hydrogen atom, an alkyl group or the residue of a monoepoxide compound after the epoxide group has been reacted with a primary amino group,*
R₃ is an alkoxy, hydroxyalkoxy, hydroxypoly(alkoxy) group or -NH₂, and
R₄ is a hydrogen atom or a methyl group; or
(A2) beta-hydroxyalkylamines having the formulae —

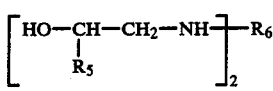   (II)

wherein —
R₅ is a hydrogen atom, an alkyl group, a hydroxy alkyl group, a hydroxy poly(alkoxy) group, a group of the formula —CH₂—CH(R₄)—CO—R₃, or the residue of monoepoxide compound after the epoxide group has been reacted with a primary amino group,
R₆ represents an alkylene or poly(alkoxy) group,
or —

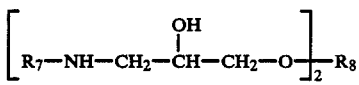   (III)

wherein —

R₇ represents an alkyl group, a hydroxyalkyl or tert.aminoalkyl group,
R₈ represents an aliphatic and/or aromatic group of a diglycidylether,
or —

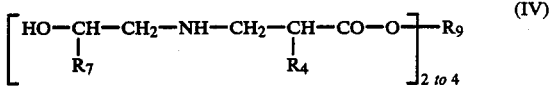   (IV)

wherein —
R₉ represents the residue of a polyol with 2 to 4 hydroxyl groups,
with,
(B) isocyanate compounds at 30 to 60° C in a ratio wherein at least one secondary amino group of a beta-hydroxyalkylamine is reacted with an isocyanate group, with the proviso that essentially polyisocyanate compounds are used for the beta-hydroxyalkylamines of group (A1), and essentially monoisocyanate compounds are used for the beta-hydroxyalkylamines of group (A2); and, thereafter, reacting
(C) the NH-groups and any other isocyanate-reactive groups of the reaction product which may be present with 50 to 100 mole-% of a semi-blocked diisocyanate at 20 to 100° C.

2. The process according to claim 1 wherein the reaction is carried out in an aprotic solvent.

3. Crosslinking component for cationnic paint binders containing hydroxyl groups and/or primary or secondary amino groups, prepared in accordance with the process of claim 1 or 2.

4. Paint binders comprising the crosslinking components of claim 3 in combination with a base resin containing hydroxyl groups and/or primary or secondary amino groups, in a ratio of 60 to 95% by weight of the base resin to 5 to 40% by weight of said crosslinking component.

5. The paint binder according to claim 4 wherein said base resin is present at from 70 to 85% by weight, and said cross-linking component is present at from 15 to 30% by weight.

* * * * *